Sept. 1, 1970 R. B. LAWRANCE ET AL 3,526,901

NRZ DIGITAL MAGNETIC RECORDING

Filed April 16, 1968 2 Sheets-Sheet 1

RICHARD B. LAWRANCE
KYRIACOS JOANNOU
RAYMOND A. CORNEAU
Inventors
by Thomas N. Tarrant
Attorney

NRZ DIGITAL MAGNETIC RECORDING

Filed April 16, 1968 2 Sheets-Sheet 2

RICHARD B. LAWRANCE
KYRIACOS JOANNOU
RAYMOND A. CORNEAU
Inventors
by Thomas N. Tarrant
Attorney

United States Patent Office 3,526,901

Patented Sept. 1, 1970

3,526,901

NRZ DIGITAL MAGNETIC RECORDING

Richard B. Lawrance, Winchester, and Kyriacos Joannou, Wayland, Mass., and Raymond A. Corneau, Pawtucket, R.I., assignors to Honeywell Inc., Minneapolis, Minn., a corporation of Delaware Filed Apr. 16, 1968, Ser. No. 721,746

Int. Cl. G11b *5/02*; G01d *15/12*; G06k *5/00*

U.S. Cl. 346—74 10 Claims

ABSTRACT OF THE DISCLOSURE

A digital magnetic recording system is described in which records of predetermined length are recorded in an NRZ (non return to zero) recording mode with an interrecord gap separating each record. In order to change individual records without leaving noise in the interrecord gap, parity bits provide that the final write current level is always the same polarity and a ramp circuit reduces the level to zero at a below threshold rate.

BACKGROUND OF THE INVENTION

In digital electronic data processing systems it is common to record data in a unit record format. For example, eighty six-bit characters can comprise a unit record. Such unit records can take the form of punched cards or they can be recorded on magnetic recording media such as drums, discs and tape. In recording unit records on magnetic recording media, it is usual to leave a blank space in between records called the "interrecord gap." The interrecord gap facilitates distinction between records and changing of individual records.

In electronic data processing, the need to store data as efficiently as possible is ever present. For this purpose, a common method of digital magnetic recording is NRZ (non return to zero) recording. In NRZ recording, write current of one polarity is usually applied to the recording head at the beginning of a record. After the beginning of the record, every "1" bit causes a transition of the Write current through zero to the opposite polarity. Every "0" bit leaves the current unchanged. In "read" operation, the first transition may be used to signal the start of the record and the length of the record is in some cases determined by the absence of transitions over a predetermined time interval. Because of this, the write current is desirably returned to zero at the end of a record and the interrecord gap must be kept clean of noise. Noise in the interrecord gap could be erroneously recognized as a data transition indicating that the end of the record hasn't been reached or as a beginning of record transition. Unfortunately, turn-off of write current at the end of a record produces noise.

In original recording of a sequence of records, spacing is uniform and many techniques can be used to avoid detection of write current turn-off as a signal transition. A greater problem exists in changing a record since the position accuracy of the new record is not usually so precise.

SUMMARY OF THE INVENTION

In the present invention, a system for recording digital information as unit records on magnetic media controls the signals applied so that the last write current transition of a unit record always leaves a current of a predetermined polarity. This write current is then ramped to zero level over an extended time interval such that the transition rate is below the detection threshold of the system. This insures that the write current turn-off will not be misinterpreted as the begining of the next record or as a continuation of the same record. A preferred embodiment utilizes a parity generator in an NRZ recording system to provide that the final write current level of a record is always the same. Capacitive decay is used to ramp write current turn off.

DESCRIPTION OF THE PREFERRED EMBODIMENT

Figure 1:
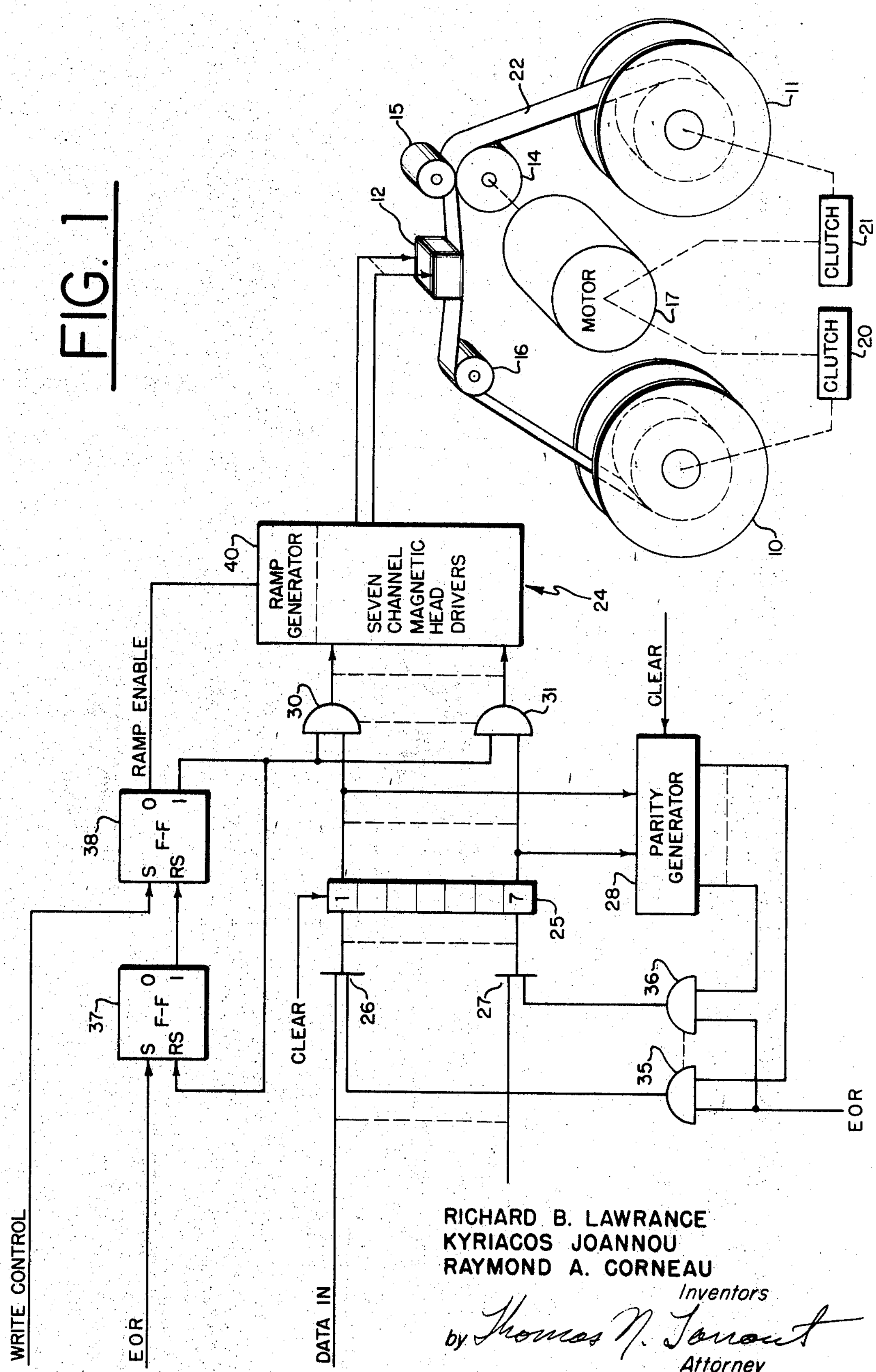
FIG. 1 is a diagrammatic illustration of a magnetic tape recording system with a digital data input system.

FIG. 1 depicts a conventional tape transport system comprising magnetic tape supply and takeup reels 10 and 11, magnetic recording head 12, drive capstan 14, pinch roller 15, idler roller 16, and motor 17. Motor 17 drives capstan 14 and also drives rels 10 and 11 through clutches 20 and 21. Capstan 14 drives recording tape 22 past recording head 12 with pinch roller 15 pinching tape 22 against capstan 14. Idler roller 16 guides the tape against head 12.

Magnetic head 12 in the embodiment illustrated comprises seven head segments for recording seven channels on tape 22. Head 12 is driven by seven channel driver unit 24.

Driver unit 24 is the output of a multiple channel digital recorder input system. Seven-bit register 25 receives data from seven input OR gates indicated by gates 26 and 27. For simplicity of illustration, the parallel systems of seven gates or lines of the seven channels have in each case been represented by two gates or lines plus a dashed line to indicate the components not shown. Register 25 is depicted as a parallel in parallel out register, but shift registers can also be used. With a shift register the data in can be entered into the register serial fashion.

Each of the seven bit portions of register 25 is connected to parity generator 28 and one of AND gates 30–31. AND gates 30–31 (seven) are each connected to provide signals to head drivers 24.

Parity generator 28 suitably comprises seven modulo-two adders. The output of these adders is always applied to AND gates 35–36. AND gates 35–36 are normally inhibited until an EOR (end of record) control signal is applied. The outputs of AND gates 35–36 are connected to OR gates 26–27 and at the end of a record AND gates 35–36 provide the modulo-two sum of each row of bits to the respective position of register 25 through OR gates 26–27.

Further controls are provided through flip-flops 37, 38 and Ramp Generator 40. A write control input is connected to the "set" terminal of flip-flop 38. The "1" output of flip-flop 38 is connected both to the "enable" inputs of AND gates 30–31 and to the "reset" terminal of flip-flop 37. The EOR control signal is connected to the "set" terminal of flip-flop 37. The "1" output terminal of flip-flop 37 is connected to the "reset" terminal of flip-flop 38.

The "0" output terminal of flip-flop 38 is connected as an enabling connection to ramp generator 40 in head driver unit 24.

Operation of the digital recording system in FIG. 1 is initiated by a data input to register 25 through gates 26–27 along with a Write control signal to the "set" input of flip-flop 38. The source of the data input signals or the control signals is not critical; however, exemplary data input sources would be a memory such as a rectangular matrix of bistable storage elements, a keyboard, a punched card reader or the like. The control signals can be manually applied through a push button switch or they can be applied by some form of electronic control element.

The Write control signal sets flip-flop 38 which, in turn, rests flip-flop 37, enables gates 30–31 and disenables ramp generator 40.

While specific head driving arrangements will be described with relation to FIGS. 2 and 3, for simplicity of description, each channel of head drivers 24 can be considered as including a flip-flop. One state of the flip-flop drives the respective head segment with current of one polarity while the other state produces a head current of the opposite polarity. Ramp generator 40 holds all head current at zero as long as enabled. On disenabling ramp generator 40, all of the head segments are driven by current of the same polarity. All of the flip-flops in the head driver 24 will be left in the same state at the end of a record as will be discussed below.

The driver flip-flops are alternately set and reset by consecutive input pulses. Thus, each time a "1" bit passes one of gates 30–31, the respective driver flip-flop changes state and the current to the respective head segment is reversed.

In the recording system described, each multibit character is recorded simultaneously with each bit recorded on a separate tape channel. Thus, magnetic recording tape 22 has seven channels or recording tracks.

Additional characters of a single record are entered through register 25 and recorded on tape 22 as it moves under head 12. At the same time the bits of each character are added modulo-two fashion in parity generator 28. That is, all the bits from channel one are added; all the bits from channel two are added etc. At the end of the record, control signal EOR enters all the modulo-two sums into register 25 to be recorded as the last character of the record.

The EOR control signal is also applied to the set input of flip-flop 37. The time required for flip-flop 37 to set and for its output to reset flip-flop 38 permits the parity character to pass through to head drivers 24 before gates 30–31 are inhibited by flip-flop 38.

It will be recognized that the parity generated by generator 28 is a "long way" or "row" parity as opposed to "column" parity. The operation of the parity generator is important in the present invention in that it insures a final head current of a predetermined polarity. For example, with the write flip-flops in head drivers 24 biased in favor of the state that produces positive polarity head current, when the equipment is turned on these flip-flops will go to that state. Upon a write control signal, ramp generator 40 will be disenabled and a positive polarity write current will flow in each head.

As a record of data flows through, the number of "1" bits in some of the seven channels will probably be odd, while in others, it will be even.

In the channels containing an odd number of "1" bits, generator 28 will attach an additional "1" bit at the end of the row to produce even parity. The channels with even "1" bits will receive a final "0" bit from generator 28 producing even parity. Remembering that in NRZ recording each "1" bit causes a transition, the even parity ensures an even number of transitions so that the final current polarity will be the same as the beginning.

For purposes of the present invention, the polarity direction at the beginning of a record is not critical, nor is it significant whether the final polarity is the same or opposite to the commencing polarity. It is convenient for the present invention to have the final polarity consistently the same with respect to other channels and other records; otherwise, considerable additional circuitry would be necessary to eliminate detectable noise introduced by Write turn-off.

At the end of the record, ramp generator 40 is enabled by the resetting of flip-flop 38. Ramp generator 40 turns off the Write current ramp-fashion over an interval measured in milliseconds whereas a transition representing a data bit is measured in micro or nano seconds. Since signal detection in reading of the magnetic tape is directly related to rate of change in the recorded flux patterns, the slow turn-off transition is nearly indetectable.

Figure 3:
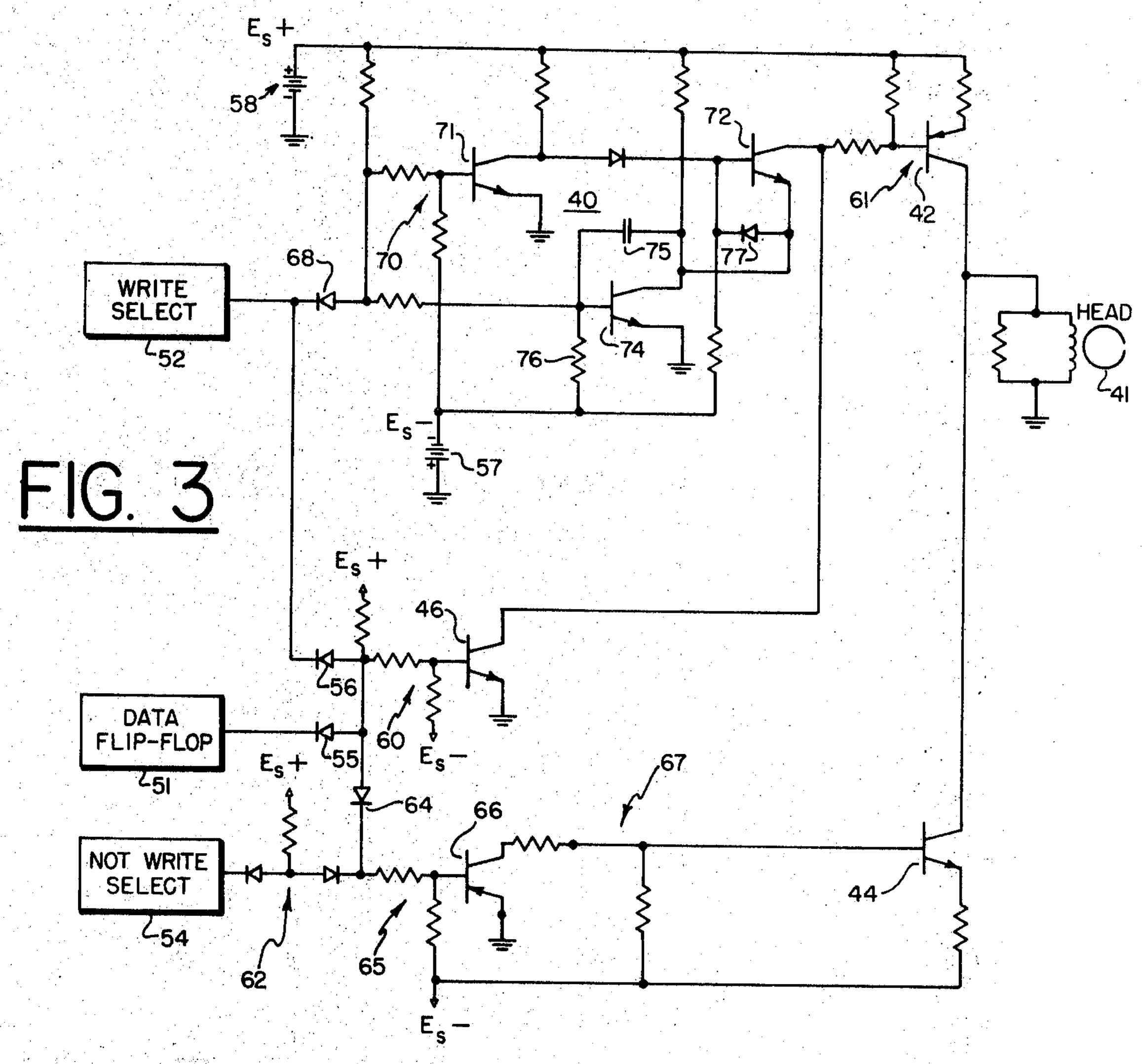
FIG. 3 is a schematic diagram of a single digital input channel.
Figure 2:
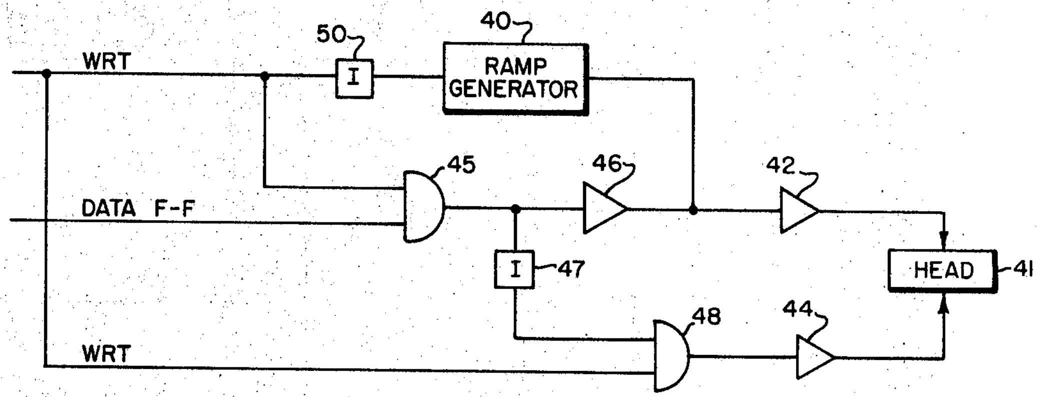
FIG. 2 is a logic diagram of a single digital recorder input channel.

FIGS. 2 and 3 illustrate specific logic and circuit implementation of magnetic recording head drivers in accordance with the invention. FIG. 2 is a logic diagram of a magnetic recording head driver for one recording channel with input from a flip-flop providing data signals and from control circuits providing a Write control signal. In this embodiment the data flip-flop can be one position of a register such as register 25 in FIG. 1 or it can be a separate flip-flop serving as a buffer element between a register and the head driver unit. The Write control signal is inverted by an inverter 50 so that it turns off ramp generator 40.

Write control is also applied to AND gate 45 along with signal from data flip-flop. The output of AND gate 45 is connected to cascaded amplifiers 46 and 42. Amplifier 42 is connected to drive head 41 with a first polarity (direction) of drive current. Thus, with a positive Write control signal and a positive output from the data flip-flop, head 41 will be driven by amplifier 42 with a current of said first polarity.

The Write control signal is also applied to AND gate 48 along with the complemented output of gate 45. Gate 48 is connected to amplifier 44 for driving head 41 with reverse polarity current relative to that supplied by amplifier 42.

When the data flip-flop reverses state responsive to a "1" data bit, the complemented output of gate 45 and the Write control signal operate gate 48 turning on amplifier 44 and reversing the current through head 41. The outputs of the data flip-flop are selected with respect to the row parity so that amplifier 42 will always be driving the recording head at the end of a unit record. At the end of the record, the Write control signal is turned off. This turns off amplifier 46 but simultaneously turns on ramp generator 40. Ramp generator 40 is connected to the input of amplifier 42 along with amplifier 46 so that amplifier 42 can be driven by either one.

With the Write control off and no drive from amplifier 46, ramp generator 40 drives amplifier 42 at a gradually decreasing level until the current in the recording head drops to zero.

When the Write control signal is reapplied, the Write current turns on fast with a polarity determined by the initial state of the data flip-flop.

FIG. 3 is a schematic of a single channel driver similar to the logic diagram of FIG. 2.

Data flip-flop 51 and Write Select 52 are connected through diodes 55 and 56 respectively forming an AND gate connected to the base electrode of NPN transistor amplifier 46. Negative and positive electrical sources 57 and 58 respectively are connected with a resistive network 60 to bias transistor amplifier 46 and establish the gating voltage. The collector electrode of amplifier 46 is connected to the base electrode of a second PNP transistor amplifier 42. Amplifier 42 is biased by a resistive network 61.

When a positive output is provided from flip-flop 51 to diode 55 and a positive output is provided from Write Select 52 to diode 56, a positive voltage is applied to the base of amplifier 46 causing it to turn on. The emitter of amplifier 46 is connected to ground so that turn-on of amplifier 46 pulls the base of amplifier 42 negative towards ground. Transistor 42 is complementary to the type of transistor 46 and is turned on by the base going negative relative to the emitter. Electron now flows through magnetic head 41 from reference (ground reference symbol), through the collector-emitter circuit of transistor amplifier 42, to electrical source 58 and back to reference.

Not Write Select 54 is a control signal source complementary to Write Select 52. During Write, the Not Write Select 54 is ineffective. In non-write, a positive signal from Not Write Select 54 blocks the first diode of 2-diode matrix 62 so that electron current from negative source 57 flows through resistive network 65 to the electrical source 58. This applies a positive voltage to the base of PNP transistor 66 turning it off. The collector of PNP transistor 66 is connected to the base of complementary type NPN transistor 44 so that turning transistor 66 turns transistor amplifier 44 off.

During Write with a positive output from data flip-flop 51, diode 64, with its cathode connected to the base of transistor 66 and having its anode connected in a common junction with the anodes of diodes 55 and 56, conducts applying a positive blocking voltage to the base of PNP transistor 66.

During Write with a negative output from data flip-flop 51, transistor amplifiers 46 and 42 are turned off, diode 64 blocks and a negative turn-on voltage is applied to the base of transistor 66 through resistive network 65. The emitter of transistor 66 is connected to reference and the emitter of transistor amplifier 44 is connected to negative source 57. Thus, when the base of amplifier 44 is raised toward reference by turn-on of transistor 66, amplifier 44 turns on supplying current from negative source 57 to head 41.

Ramp generator 40 is connected at its input to Write Select 52 through diode 68. The output of generator 40 is the collector of NPN transistor 72 connected to the base of transistor 42.

The anode of diode 68 is connected through resistor network 70 to the base electrodes of NPN transistors 71 and 74. The emitter of transistor 71 is connected to reference and the collector is connected to source 58 through a load resistor. The collector of transistor 71 is also connected to the base of transistor 72.

The emitter of transistor 72 is connected to the collector of transistor 74. The collector of transistor 74 is also connected to source 58 by a load resistor and by a capacitor to its base electrode. The emitter electrode of transistor 74 is connected to reference.

Operation of the ramp generator begins with a positive control voltage from Write Select 52. This blocks diode 68 and the base electrode voltages of transistors 71 and 74 are determined by the relationships of the resistors in network 70. These resistors are selected to provide a positive voltage at the base electrode of transistors 71 and 74 when diode 68 is back-biased.

A positive voltage on the base of transistor 71 causes it to conduct dropping the voltage on the base of transistor 72 so that transistor 72 blocks. This isolates generator 40 from amplifier 42 during a Write control signal.

The positive voltage on the base of transistor 74 causes it to conduct lowering its collector voltage. Capacitor 75 then charges to the voltage difference between the collector and base electrode of transistor 74.

When the control signal from Write Select 52 goes negative, diode 68 unblocks and the negative input voltage turns transistor 71 off. The positive going signal produced at the collector of transistor 71 turns transistor 72 into conduction. The drive current from the collector of transistor 72 replaces the drive current from transistor 46 when Write Select 52 goes negative. The current supplied by transistor 72 is provided through the emitter-collector circuit of transistor 74 and is controlled by the conductive condition of that transistor. The negative signal from Write Select 52 tends to turn transistor 74 off. However, the charge stored in capacitor 75 offsets the negative signal so that transistor 74 gradually goes out of conduction during a time controlled by the discharge rate of capacitor 75.

When capacitor 75 has discharged to the point where transistor 74 can no longer stay conductive, the current path to transistor 72 is broken. Transistor 42, having lost its drive, goes out of conduction so that no current flows through head 41.

Capacitor 75 provides the ramp with the slope of the ramp being determined by the resistor-capacitor time constant. While the maximum ramp time is limited by the length of the interrecord gap, a ramp of about one millisecond is usually adequate to substantially reduce turn-off noise. With capacitor 75 having a value of .033 microfarad and the collector load resistor of transistor 74 having a value of 16,000 ohms, a ramp of about 1.1 milliseconds has been obtained. This ramp reduced the turn-off noise to less than one percent of the peak signal voltage as detected when reading in the normal manner.

Generally, it has been found that for reliable operation, noise in the interrecord gap should be kept below 3% of the peak signal voltage detected during read.

When the source system is always utilized for both Write and Read, it is a simple matter to use logic and/or timing to eliminate the noise produced by Write turn-off. The present invention is particularly useful where read operations are frequently in a different system disassociated from the Write system.

In one application using the circuit of FIG. 3, the peak signal voltage was 3 volts. Write current turn-off without the ramp generator produced a signal of six-tenths of a volt. With the ram generator, the Write current turn-off produced a 25 millivolt noise signal representing less than one percent of the peak signal voltage.

While the invention has been described with relation to specific embodiments, many variations thereof will be obvious to those skilled in the art and it is intended to cover the invention broadly within the spirit and scope of the appended claims.

We claim:

1. A digital magnetic recording system comprising:
(a) a magnetic recording transducer;
(b) means to transport a magnetic recording medium adjacent to said transducer;
(c) electrical circuit means for applying non-return to zero digital signals to said transducer;
(d) parity generating means providing a parity signal at the end of a given record length of said digital signals such that the last transition of every record length of said digital signal is always in the same polarity direction and
(e) means to reduce the electrical current level of the final signal applied to said transducer in recording a record, to zero over a finite period of time such that the transition rate is substantially below that required for signal detection in said system.

2. A digital magnetic recording system according to claim 1 wherein said electrical circuit means comprises means to provide a write control signal, a complementing flip-flop for providing data signals, and drive means enabled by said write control signal to provide a current flow through said transducer that reverses with each change in state of said flip-flop.

3. A digital magnetic recording system according to claim 2 wherein said means to reduce the electrical current level comprises electrical storage means driven from a first to a second condition by application of said write control signal and operative on the cessation of said write control signal to reduce said electrical current level over a period determined by the return of said storage means to said first condition.

4. A digital magnetic recording system according to claim 3 wherein said electrical storage means is a capacitor connected between the collector and base electrodes of a transistor amplifier controlling the turn off of write current in said transducer.

5. A digital magnetic recording system according to claim 1 wherein said parity generating means comprises a modulo-two adder connected to insert the modulo-two sum of a record length of signals at the end of each record.

6. A method of reducing interrecord gap noise in non-return-to-zero magnetic recording comprising:
(a) terminating a recorded record with a recording head write current of a predetermined polarity;
(b) ramping said write current to zero over an extended time interval such that detection of the transition rate produced by said ramp yields a signal voltage substantially less than three percent of the peak signal voltage provided by data transitions.

7. A method according to claim 6 wherein said predetermined polarity is determined by generating parity for each record whereby the terminal current polarity is consistent.

8. Magnetic recording transducer drive in a system for non-return-to-zero recording of groups of data signals in which the write current is reduced to zero in the interrecord gap between each of said groups comprising:

(a) electrical circuit means for driving write current through a recording transducer in alternative directions to represent signal transitions;

(b) control means connected to said circuit means for gating said circuit means on and off;

(c) signal means connected to said circuit means operative to reverse the direction of said write current upon each signal transition; and (d) ramp generating means connected to said electrical circuit means operative, upon said control means gating said circuit means off, to ramp said write current down to zero at a rate substantially less than the rate at which said signal means reverses said write current.

9. Magnetic recording transducer drive according to claim 8 wherein said signal means comprises means for returning said write current to a predetermined direction before said control means gates off said circuit means.

10. Magnetic recording drive according to claim 8 in which said ramp generating means comprises means to generate a ramp to drive said write current to zero at a rate to produce a magnetic change on recording material detectable as a voltage of less than one percent of the voltage detectable from changes controlled by said signal means.

References Cited

UNITED STATES PATENTS 3,147,462 9/1964 Levinson et al. ---- 340—174.1

BERNARD KONICK, Primary Examiner

G. M. HOFFMAN, Assistant Examiner

U.S. Cl. X.R.

340—174.1